Nov. 15, 1966  J. C. ZIMMERMAN  3,284,866
PIPE CLAMP
Filed Sept. 18, 1964

INVENTOR.
JOSEPH C. ZIMMERMAN
BY
Lothrop & West
ATTORNEYS

3,284,866
PIPE CLAMP
Joseph C. Zimmerman, San Francisco, Calif., assignor to
Western Piping & Engineering Co. Inc.
Filed Sept. 18, 1964, Ser. No. 397,467
3 Claims. (Cl. 24—277)

My invention relates to band-like devices for circumscribing pipes for the purpose of holding various pipe portions temporarily or permanently together.

It is an object of the invention to provide a two-piece pipe clamp effective to secure the pipe parts in clamped relationship and particularly easy to fabricate by quantity production methods such as die casting.

Another object of the invention is to provide a pipe clamp in which the clamp body is fabricated in such a way as to have functionally closed passageways formed without the necessity of boring or drilling, yet providing an appropriate enclosure for the cooperating parts.

Another object of the invention is to provide a pipe clamp which is stable in use and resists the effect of dislodging forces from various directions.

Other objects together with the foregoing are attained in the embodiment of the invention described in the accompanying description and illustrated in the accompanying drawing, in which.

Figure 1:
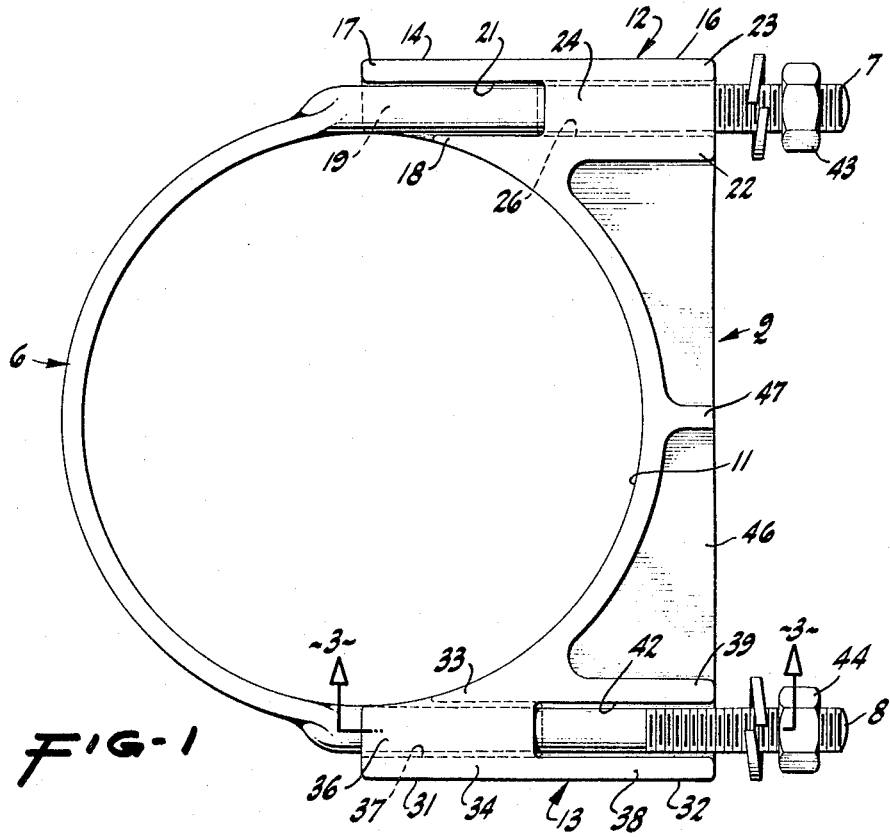
FIGURE 1 is a front elevation of a pipe clamp constructed pursuant to the invention.
Figure 2:
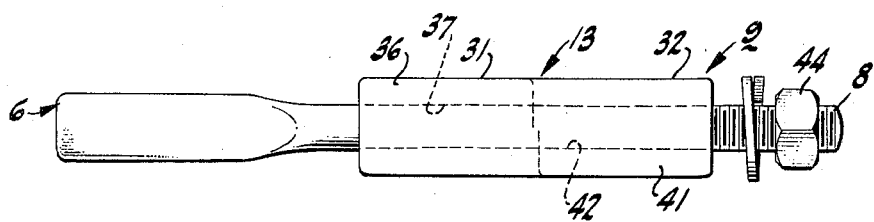
FIGURE 2 is a side elevation of the pipe clamp of FIGURE 1.
Figure 3:
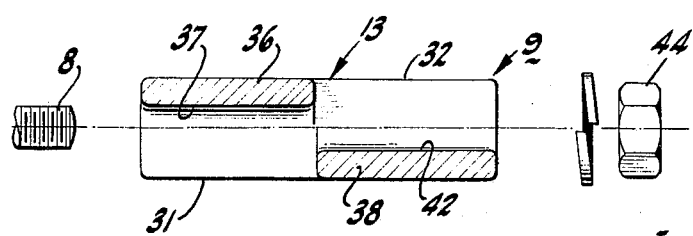
FIGURE 3 is an exploded view, parts being in cross section, the plane of which is indicated by the line 3—3 of FIGURE 1.

While the pipe clamp pursuant to the invention can be utilized in various different environments and can be suitably modified accordingly, it has been commercially embodied as shown herein. The pipe clamp includes a clamp yoke 6. This is a generally U-shaped member conveniently fabricated of a rod circular in cross section bent upon itself and centrally flattened to afford a pair of parallel legs 7 and 8, both of which are threaded along the end portions. The legs are of sufficient length to receive a clamp body 9. This is conveniently fabricated as an integral member of cast metal or durable plastic, the casting process being either a sand casting or a die casting.

The clamp body 9 includes a central arcuate portion 11 having substantially the same curvature as the curvature of the yoke 6 so that the yoke and the central section define an appropriate surrounding element to clamp a pipe. The central section is symmetrical with respect to a pair of side housings 12 and 13. These are spaced apart substantially the same distance as the legs 7 and 8 and, like the legs, are parallel.

So that the legs can pass through each of the side housings and so that such housings can easily and cheaply be fabricated, thus reducing the cost of the clamp body, each side housing is provided with an inner portion 14 and an outer portion 16. The designations of these portions refer to their distance from the yoke 6. The inner portion 14 of one of the housings is arranged in immediate, end-to-end relationship with the outer portion 16 of that housing. The inner portion is inclusive of a pair of opposite side walls 17 and 18 and an intervening back wall 19. The three walls 17, 18 and 19 are approximately at right angles to each other. This wall construction leaves the inner end of the inner portion 14 open and also leaves the front wall of the inner portion open, thus defining a cavity 21.

In a comparable fashion, the outer portion 16 is inclusive of a pair of side walls 22 and 23 arranged opposite each other and also is inclusive of a front wall 24 at right angles to the side walls 22 and 23. This arrangement leaves the back wall open and the end wall open. Since the two sections 14 and 16 are immediately adjacent each other, they define a continuous passage through the entire side housing. This passage can be formed by pattern sections defining the cavities 21 and 26 and merging in the central portion. There is no necessity for any drilling or coring in a direction parallel to the leg 7. Since the walls 19 and 24 are in locations opposite each other, there results a passage through the entire length of the side housing which, considered as a whole, is enclosed on four sides. The through passage is laterally continuous.

In a comparable fashion, the side housing 13 is arranged with an inner section 31 and outer section 32 in immediate end-to-end relationship therewith. The inner section 31 is comprised of a pair of opposite side walls 33 and 34 and a front wall 36, the back and end walls being omitted. This defines a cavity 37. The outer portion 32 is made up of a pair of opposite side walls 38 and 39 and a rear wall 41, thus defining a cavity 42. Consequently, there is provided a through passage in the side housing 13 without the necessity of any drilling or through coring operation in the direction of the leg 8. The through passage considered as a whole is provided along its length with four surrounding walls so that the passage is laterally continuous.

Upon assembly of the clamp portions around a pipe, the yoke legs 7 and 8 are passed through the through passages in the side housings and the projecting threaded ends of the legs receive fastening nuts 43 and 44 so that the clamp body is moved toward the clamp yoke to secure the pipe parts in position. Since the back wall 19 on one side housing is in opposite location to the front wall 36 on the other side housing, any motion of the clamp body in a transverse rocking direction is precluded by one or the other of the walls 19 and 36. Such motion is also precluded by one or the other of the opposite walls 24 and 41.

For reasons of strength, if desired, the arcuate portion 11 is made of the same thickness as the side housing, even though a center web 46 is somewhat thinner. If desired, a central rib 47 can be provided as a stiffener so that the forces in the center part of the clamp are well distributed.

When a pipe clamp is made as disclosed herein, it can very quickly and cheaply be fabricated in a die or mold having opposing cavity forming dies coming together in a plane normal to the legs 7 and 8 of the clamp or to the through passageways. When the device is removed from the mold, the through passages are complete and no machining or hole-forming work is required.

What is claimed is:

1. A pipe clamp comprising a clamp body having a central arcuate portion and a pair of side housings, at least one of said housings having an inner portion defined by a back wall and two opposite side walls to leave an open inner end and an open front and having an outer portion defined by a front wall and two opposite side walls to leave an open outer end and an open back, said open front and said open back terminating substantially in the same plane, a U-shaped yoke having a pair of parallel threaded legs adapted to lie within said side housings and to pass through said inner end and said outer end, and nuts on said legs adapted to abut said side housings.

2. A pipe clamp comprising a clamp body having a central arcuate portion and a pair of side housings, one of said side housings having an inner portion defined by a back wall and two opposite side walls to leave an open inner end and an open front and having an outer portion defined by a front wall and two opposite side walls to leave an open outer end and an open back, the other of said side housings having an inner portion defined by a front wall and two opposite side walls to leave an open inner end and an open back and having an outer portion defined by a rear wall and two opposite side walls to leave an open outer end and an open front, all of said open backs and open fronts terminating substantially in the same plane, a U-shaped yoke having legs adapted to lie within and project from both ends of said side housings, and means engaging said legs for holding said yoke and said clamp body together.

3. An article of manufacture for use in a pipe clamp comprising a clamp body having a central arcuate portion and a pair of side housings, each of said housings having an inner portion defined by a back wall and two opposite side walls to leave an open inner end and an open front and having an outer portion defined by a front wall and two opposite side walls to leave an open outer end and an open back, said open front and said open back terminating substantially in the same plane, and one of said side walls of each of said inner portions merging with said central arcuate portion.

References Cited by the Examiner
UNITED STATES PATENTS

| | | | |
|---|---|---|---|
| 1,511,723 | 10/1924 | Draver | 285—322 |
| 1,583,677 | 5/1926 | Edelmann | 24—279 |
| 1,819,750 | 8/1931 | Krolzig | 248—63 |
| 2,396,119 | 3/1946 | O'Neil | 239—265 X |
| 2,669,729 | 2/1954 | Stader | 248—62 X |
| 2,843,155 | 7/1958 | Risley et al. | 138—99 |

WILLIAM FELDMAN, *Primary Examiner.*

DONALD A. GRIFFIN, *Examiner.*